United States Patent [19]
Meisel, Jr.

[11] 4,279,318
[45] Jul. 21, 1981

[54] TRACK TENSIONING APPARATUS

[75] Inventor: Thomas C. Meisel, Jr., Peoria, Ill.

[73] Assignee: Caterpillar Tractor Co., Peoria, Ill.

[21] Appl. No.: 92,913

[22] Filed: Nov. 9, 1979

Related U.S. Application Data

[63] Continuation-in-part of Ser. No. 909,759, May 26, 1978, abandoned.

[51] Int. Cl.³ ............................................. B62D 55/30
[52] U.S. Cl. ..................................... 180/9.64; 305/10; 305/29; 305/32
[58] Field of Search .............................. 305/10, 15–16, 305/29–32, 22; 180/9.64, 9.2 C, 24.05, 9.26, 9.52

[56] References Cited

U.S. PATENT DOCUMENTS

| | | | |
|---|---|---|---|
| 1,388,750 | 8/1921 | Palmer | 305/31 X |
| 1,482,726 | 2/1924 | Best | 305/29 X |
| 1,868,148 | 7/1932 | McMillian et al. | |
| 2,496,136 | 1/1950 | Smith | |
| 2,584,512 | 2/1952 | Strait | |
| 2,719,062 | 9/1955 | Arps | |
| 3,063,510 | 11/1962 | Hunger et al. | |
| 3,101,977 | 8/1963 | Hyler et al. | |
| 3,182,741 | 5/1965 | Roach | |
| 3,310,127 | 3/1967 | Siber et al. | |
| 3,446,302 | 5/1969 | Schoonover | 305/10 |
| 3,447,620 | 6/1969 | Schoonover | |
| 3,447,621 | 6/1969 | Schoonover | |
| 3,539,229 | 11/1970 | Scully | |
| 3,647,270 | 3/1972 | Althaus | |
| 3,774,708 | 11/1973 | Purcell et al. | |
| 3,901,563 | 8/1975 | Day | |
| 3,910,649 | 10/1975 | Roskaft | |
| 3,970,327 | 7/1976 | Dezelan | |
| 4,087,135 | 5/1978 | Unruh | |
| 4,090,723 | 5/1978 | Hart | |
| 4,149,757 | 4/1979 | Meisel, Jr. | 305/10 |

FOREIGN PATENT DOCUMENTS

| | | |
|---|---|---|
| 2143329 | 12/1977 | Fed. Rep. of Germany . |
| 838894 | 6/1960 | United Kingdom . |
| 372108 | 10/1973 | U.S.S.R. . |

*Primary Examiner*—Charles A. Marmor
*Attorney, Agent, or Firm*—William B. Heming

[57] ABSTRACT

A continuous track assembly (12) has a frame (16) and first and second elements (18,20) pivotally connected to the frame (16). Each element (18,20) has a rotatable wheel (22,24) about which a track (30) is positioned. Either wheel (22,24) can be rotated when desired by power and driving apparatus (36,44) in an associated vehicle (10) to drive the track (30). Tension in the track (30) is maintained at a preselected level by apparatus (50) which moves the first and second elements (18,20) relative to one another to position the wheels (22,24) against the track (30). The wheels (22,24) are freely pivotally movable to enable the track assembly (12) to readily adapt to its environment and maximize tractive effort. Maintaining desired track tension substantially overcomes problems associated with a track which is too loose or tight which can result in slipping or damage to the track assembly (12).

6 Claims, 1 Drawing Figure

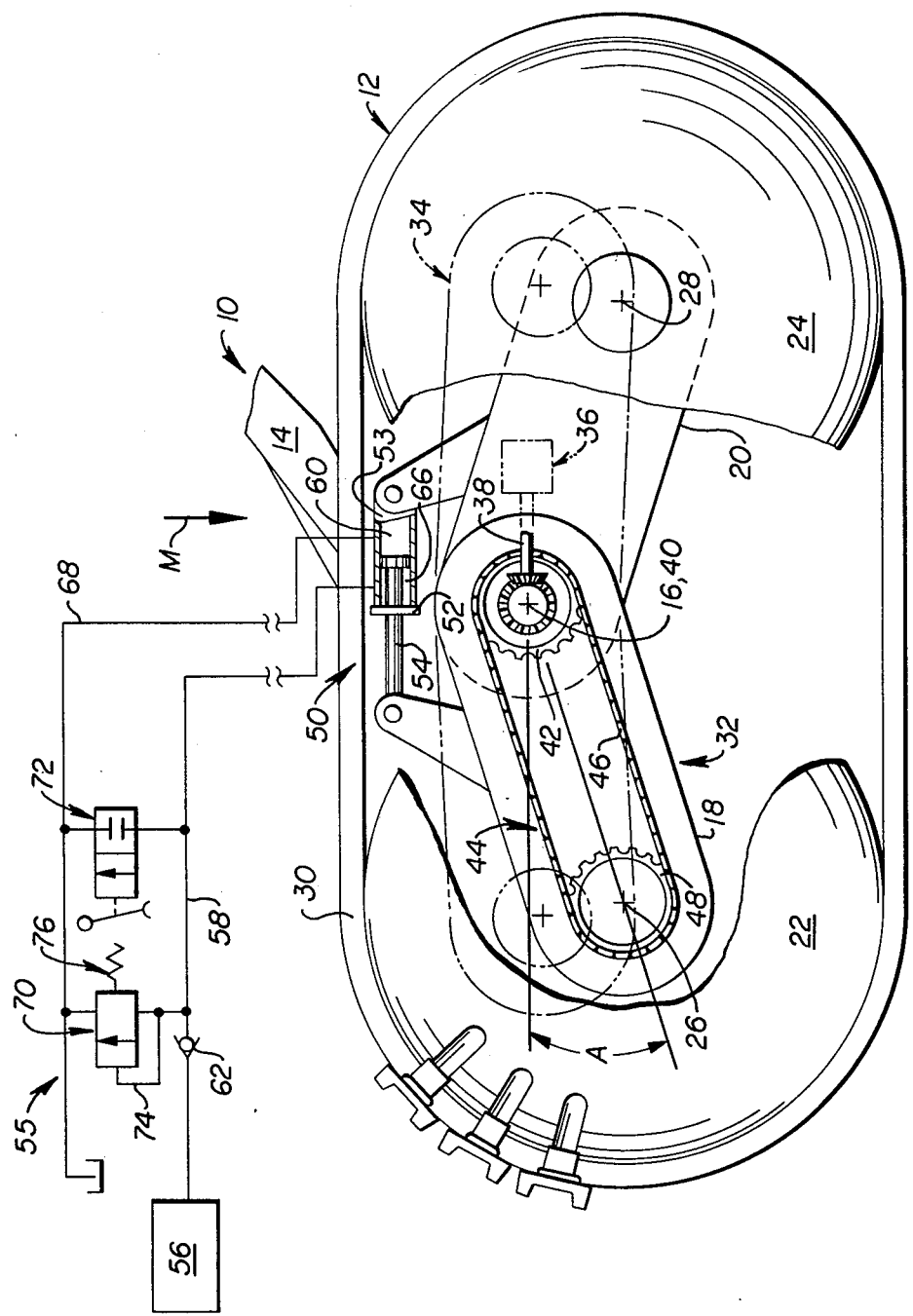

TRACK TENSIONING APPARATUS

CROSS REFERENCE TO RELATED APPLICATIONS

This application is a Continuation-in-Part of application Ser. No. 909,759 filed May 26, 1978, by Thomas C. Meisel, Jr., now abandoned.

DESCRIPTION

1. Technical Field

The invention relates to apparatus for tensioning track positioned about wheels in a continuous track assembly. More particularly, the invention relates to first and second wheels associated with first and second elements which are pivotally movable to adjust track tension by changing position of the wheels.

2. Background Art

In the use of a continuous track assembly, it is desirable to controllably position the wheels of the track assembly relative one to the other to properly maintain tension of the track about the wheels.

For example, a continuous track assembly is used on a work vehicle to provide increased traction. The track assembly generally includes wheels about which a track is positioned. It is desirable that the track conform to uneven terrain during operation of the vehicle and not penetrate the terrain surface. This provides maximum tractive effort and does not seriously disturb ground conditions.

Heretofore, track tensioning has been commonly maintained or adjusted by providing horizontal movement of one wheel relative to another wheel as is common on track-type tractors. Such track tensioning devices are shown, for example, in U.S. Pat. No. 4,149,757 which issued to T. C. Meisel, Jr. on Apr. 17, 1979 and 2,719,062 which issued to B. F. Arps on Sept. 27, 1955. Such track assemblies result in a generally rigid structure which resists the tendency of the track assembly components to adapt to the working environment. In vehicles operating over rough terrain, such as log skidders, the result can be a tractive effort or disturbance of the ground which is unacceptable for the particular working environment. Also, the operator typically must be more attentive to travel areas of the vehicle, which can limit its versatility.

In order to maximize adaptation of the vehicle to its environment to solve such problems, it can be desirable to allow wide pivotal movement of one or more of the wheels about which the track is positioned. However, it may therefore be necessary to permit pivotal movement of a wheel driven by a power source on the vehicle. More conventional track assemblies, such as in the above-described patents, typically do not provide this possibility. Also, the track assemblies disclosed in U.S. Pat. No. 4,087,135 which issued on May 2, 1978, to D. H. Unruh, U.S. Pat. No. 2,496,136 which issued on Jan. 31, 1950, to R. W. Smith, and British Pat. No. 611,543 issued to R. F. Skelton and published on Nov. 1, 1948, do not lend themselves to such pivotal action.

The present invention is directed to overcoming one or more of the problems as set forth above.

DISCLOSURE OF INVENTION

In one aspect of the present invention, a work vehicle has a frame and first and second elements each having a rotatable wheel and being connected to the frame and pivotally movable about an axis of the frame. A track is positioned about the wheels and has a tension relative to the wheels. Power means is provided for driving at least one of the wheels. Means is also provided for moving the first and second elements one relative to the other for maintaining tension in the track.

In operation of the work vehicle, the track and wheel assembly is freely pivotally movable to adjust to changes in the terrain. Tension in the track is maintained through relative movement of the wheels inside of, and against, the track. This substantially overcomes problems associated with too much work tension experienced in going over a rock, for example, or under circumstances where track tension diminishes to an undesirable level.

BRIEF DESCRIPTION OF DRAWINGS

The drawing is a diagrammatic side view in partial cutaway of one embodiment of the present invention.

BEST MODE FOR CARRYING OUT THE INVENTION

Referring to the drawing, a work vehicle 10 has a continuous track assembly 12 and a frame 14. The frame has an axis 16 about which the continuous track assembly is oriented on the vehicle, as will be discussed. The continuous track assembly includes first and second elements 18,20 having first and second wheels 22,24, respectively, connected thereto. The wheels each have an axis 26,28 about which they are rotatable on their respective elements. A track 30 is positioned about and in contact with both the first and second wheels and has a tension relative to said wheels. As shown, said wheels are represented by tires, such as of the pneumatic type, which are enveloped by a flexible belt having individual shoes which represents the track. It should be understood that the wheels and track can be of other configurations as is known in the art without departing from the invention.

The first element 18 is connected to the frame 14 and pivotally movable relative to the frame about the axis 16 of the frame. The second element 20 is also connected to the frame and pivotally movable relative to the frame about the axis 16 of the frame, as well as being pivotally movable relative to the first element. The first and second elements can be individually pivotally mounted on the frame or pivotally connected one to the other. As will be understood from the drawings, the first and second wheels are, as a result, movable one relative to the other about radii associated with the frame axis and the wheel axes 26,28. The wheels can thus be moved between a first position 32 at which the axes 26,28 of said wheels are spaced a first preselected distance one from the other and a second position 34 at which said axes are spaced a second preselected different distance one from the other. The distance between the axes is controllably determined to adjust or maintain tension in the track 30, as will be further explained.

Further provided on the work vehicle 10 is power means 36 for rotating at least one of the first and second wheels 22,24 for driving the track 30. The power means can be, for example, a frame mounted hydraulic motor and bevel gear drive 38 as shown or any other source of rotational motion such as, for example, a hydraulic motor, placed at the first wheel and powered through lines which enter the first element 18 at the frame axis 16, which directly drives said first wheel. The orientation of the gear drive results in an axis of rotation 40 of the power means substantially the same as or aligned with the axis 16 of the frame. A first sprocket 42 is also connected to the gear drive and rotatable about its axis 16 in response to rotational output of the hydraulic motor. Driving means 44, shown as a chain 46, the first sprocket and a second sprocket 48, transfers the rotational motion initiated about the axis of rotation by the motor to the wheel or wheels to be rotatably driven from said motor. The second sprocket 48 is connected to and rotates with the first wheel. The chain is positioned about and in engagement with both sprockets to drive the first wheel. The second wheel can also be driven alone or with the first wheel as desired.

The work vehicle 10 also has means 50 for controllably moving the first and second elements 18,20 one relative to the other for controllably maintaining a preselected tension in the track 30 relative to the wheels 22,24. In the embodiment shown, the track assembly 12 has a hydraulic cylinder 52 connected at a first end 53 to the first element and at a second end 54 to the second element. The cylinder, as a portion of the track tensioning means, can be used to adjust or maintain track tension in that it is positioned at a location sufficient for pivotally moving the first and second elements between their first and second positions 32,34. However, in another embodiment of the invention, the mass M of the vehicle itself is usable in determining track tension, as will be further explained.

When the hydraulic cylinder 52 is used to determine track tension, the track tensioning means 50 also includes a hydraulic circuit 55 to control operation of the hydraulic cylinder. The circuit shown is of a configuration sufficient for automatically, controllably maintaining a preselected fluid pressure to the hydraulic cylinder in response to the amount of tension of the track 30 relative to said first and second wheels 22,24. The cylinder is connected by the circuit to a high pressure fluid source 56. The circuit consists of a supply line 58 connecting the fluid source to a first end fluid chamber 66 of the cylinder. A check valve 62 in the supply line 58 controls flow in a single direction from the fluid source to the cylinder. A second end fluid chamber 60 is connected to a return line 68. A relief valve 70 connects to the supply line between the check valve and the cylinder and to the return line. As is further shown, a two position dump valve 72 can be connected between the lines to exhaust fluid from the supply line and the first fluid chamber to a tank 74 for retracting the cylinder and collapsing the track.

Such circuit components and the hydraulic cylinder 52 are well known in the art. The circuit 55 or track tensioning means 50 can also be of other configurations as is known in the art. For example, cylinder operation can be controlled manually through a control valve which connects to the cylinder through another valve. Said latter valve in combination with an accumulator can be used to provide tension relief for the track with the cylinder in a floating, pressurized condition.

When the mass M of the vehicle 10 is used to determine track tension, the hydraulic cylinder can be deactivated to "free float" or need not be included as a portion of the track assembly. The mass of the vehicle determines the weight or load acting upon or seen by the wheels 22,24 as the vehicle pushes down on the first and second elements 18,20 through their connection with the frame 14. The load tends to move the wheels outwardly against the track 30 to create a tension on the track owing to resistance of the track to movement of the wheels. The resultant track tension is directly proportional to the load on the track assembly 12. Thus, the tension can be changed by changing the mass of the vehicle, such as by adding or removing counterweight. It will be understood by one skilled in the art that the orientation of the first and second elements along with the weight of the vehicle can be adjusted to initiate a desired tension in the track for particular work conditions. For example, an increase in the angle A of the first element positioned relative to the belt, will decrease tension in the track. Thus, the angle A may be changed by changing length of the track or of the first and second elements in the construction of the track assembly to establish the desired tension in the track during operation of the track assembly 12.

It is desirable that the first and second elements 18,20 be free from connection one with the other at locations spaced from their pivotal connections at the frame 14. This allows free pivotal movement of said elements to maximize track assembly adaptation to the terrain, especially in more extreme circumstances. Also, the axis 16 of the frame is necessarily at an elevation greater than the axes 26,28 of the first and second wheels 22,24 for using vehicle mass M to tension the track. Such configuration is also the most desirable where the cylinder 52 is used.

It should be understood that the track assembly 12 and particularly the first and second elements 18,20 and power and driving means 36 can be of other configurations as is known in the art without departing from the invention.

Industrial Applicability

In initiating or maintaining desired tension in the track 30, the first and second elements 18,20 are pivotally moved one relative to the other to position the first wheel axis 26 a preselected distance from the second wheel axis 28. In this manner, the first and second wheels 22,24 are urged against the track 30 for the desired tension. Therefore, the tendency of the track under certain conditions to loosen and to slip or jump from the wheels, or to tighten and cause damage to the track assembly 12, is substantially overcome.

For example, on the work vehicle 10, the hydraulic motor and bevel gear train 38 rotate the first wheel 22 and/or the second wheel 24 through the chain drive mechanism 44. The driven wheel or wheels 22,24 engage the track 30 to propel the vehicle 10. The track assembly components tend to conform to the terrain during movement of the vehicle 10 as where the first and second elements 18,20 move pivotally in response to uneven terrain conditions. The track 30 also conforms to the terrain and to foreign objects located between the track and one of the wheels. Therefore, the pathway about the wheels through which the track passes also changes. The result is a change in track tension relative to the wheels.

In embodiments making use of the hydraulic cylinder 52, track tension is controllably maintained by the hydraulic cylinder in response to relative movement of elements in the track assembly 12. Under typical conditions, fluid passes from the fluid source 56, through the supply line 58, and to the first end chamber 66. This tends to extend the cylinder and pivotally, outwardly move the first and second elements 18,20. Therefore, the outer surfaces of the wheels 22,24 continuously urge against the track 30 to create tension on the track. The tension is determined by the relief valve 70.

If tension on the track 30 becomes too great, as when traveling over a rock, the track resists expansion and pressure builds in a pilot line 74 and overcomes biasing means 76, shown as a spring, at a preselected magnitude. This moves the relief valve 70 to the open position, fluid is exhausted through the return line 68, and track tension becomes less as the first and second elements 18,20 move, for example, from the second 34 toward the first 32 position. In the above described manner, a constant preselected range of fluid pressure in the hydraulic circuit and predetermined expansion of the track relative to said pressure range serve to controllably maintain the tension of the track relative to the wheels.

In using the mass M of the vehicle 10, as acted upon by the force of gravity, to determine track tension, tension in the track 30 remains essentially constant owing to the steady or unchanging force exerted by the weight of the vehicle on the first and second elements 18,20. Tension tends to remain unchanged also where conditions on the track change. For example, in traveling over a rock, the track 30 tends to accommodate the rock and change its generally linear pathway along the ground. The result is that the first and second elements 18,20 will move pivotally inwardly or towards each other and cause the vehicle to raise upwardly. The first and second elements are thus positioned at a greater angle (such as the greater angle A which results in going from the second 34 toward the first 32 position of the first and second elements 18,20) which represents a condition of lesser track tension. This accommodates the increased track tension created in traveling over the rock and maintains track tension approximately the same as the desired level.

It will be apparent, therefore, that the hydraulic circuit 55 and cylinder 52 and the mass M of the vehicle 10 each, in effect, automatically move the first and second elements 18,20 one relative to the other in response to a change in the preselected tension in the track 30 for automatically, controllably maintaining the preselected tension. Thus, the continuous track assembly 12 substantially prevents problems associated with track slippage relative to the wheels, reduced traction or increased tension. To increase traction, more tension can be created in the track by, for example, raising the pressure relief setting of the relief valve 70 or adding counterweight to the vehicle. Such action will not increase the power required to drive the track assembly 12 (up to, for example, bearing overload), but more power can be used.

Other aspects, objects and advantages will become apparent from a study of the specification, drawings and appended claims.

I claim:

1. A work vehicle (10), comprising:
 a frame (14) having an axis (16);
 a first element (18) having a first wheel (22) and being connected to said frame (14) and pivotally movable relative to said frame (14) about said axis (16) of said frame (14), said first wheel (22) having an axis (26) and being rotatable about said axis (26);
 a second element (20) having a second wheel (24) and being connected to said frame (14) and pivotally movable relative to said first element (18) and about said axis (16) of said frame (14), said second wheel (24) having an axis (28) and being rotatable about said axis (28), said second wheel (24) and said first wheel (22) being movable one relative to the other between a first position (32) at which said axes (26,28) of said first and second wheels (22,24) are spaced a first preselected distance one from the other and a second position (34) at which said axes (26,28) of said first and second wheel (22,24) are spaced a second different preselected distance one from the other;
 a track (30) positioned about and in contact with said first and second wheels (22,24) and having a tension initiated in response to said first and second wheels (18,20) being urged against said track (30);
 power means (36) for rotating at least one of said first and second wheels (18,20) for driving said track (30) with said at least one of said wheels (18,20); and
 means (50) for controllably, pivotally moving said first and second wheels (22,24) one relative to the other for controllably maintaining a preselected tension in said track (30), said means (50) including a hydraulic cylinder (52) having first and second ends (53,54) and being connected at one of said ends (53,54) to said first element (18) and at the other of said ends (53,54) to said second element (20) at locations for pivotally moving said first and second elements (18,20) one relative to the other.

2. The work vehicle (10), as set forth in claim 1, wherein said axis (16) of said frame (14) is at an elevation greater than said axes (26,28) of said first and second wheels (22,24).

3. The work vehicle (10), as set forth in claim 1, wherein said track tensioning means (50) includes a hydraulic circuit (55) of a configuration sufficient for automatically, controllably maintaining a preselected fluid pressure to said hydraulic cylinder (52) in response to the amount of tension of said track (30).

4. The work vehicle (10), as set forth in claim 1, wherein said power means (36) has an axis of rotation (40) substantially the same as said axis (16) of said frame (14) and including driving means (44) for transferring rotational motion initiated about said axis of rotation (40) of said power means (36) to said ones of said first and second wheels (22,24) being rotated by said power means (36).

5. The work vehicle (10), as set forth in claim 4, wherein said driving means (44) includes first and second sprockets (42,48) and a chain (46), said first and second sprockets (42,48) being rotatable in response to said power means (36) and connected to and rotatable with one of said first and second wheels (22,24), respectively, said chain (46) being engagingly positioned about said first and second sprockets (42,48).

6. The work vehicle (10), as set forth in claim 1, wherein said track tensioning means (50) automatically moves said first and second elements (18,20) one relative to the other in response to a change in said preselected tension in said track (30) for automatically, controllably maintaining said preselected tension.

* * * * *